(12) United States Patent
deMilo et al.

(10) Patent No.: US 8,799,322 B2
(45) Date of Patent: Aug. 5, 2014

(54) POLICY DRIVEN CLOUD STORAGE MANAGEMENT AND CLOUD STORAGE POLICY ROUTER

(75) Inventors: David deMilo, Scotts Valley, CA (US); David Brian Ferriera, San Jose, CA (US); Ramkumar Viswanathan, Cary, NC (US); Ravindra Mahajani, Cary, NC (US); Blaine Lincoln, Fontana, CA (US); James McKernan, Talent, OR (US)

(73) Assignee: Cisco Technology, Inc., San Jose, CA (US)

( * ) Notice: Subject to any disclaimer, the term of this patent is extended or adjusted under 35 U.S.C. 154(b) by 481 days.

(21) Appl. No.: 12/509,330

(22) Filed: Jul. 24, 2009

(65) Prior Publication Data

US 2011/0022642 A1 Jan. 27, 2011

(51) Int. Cl.
*G06F 17/30* (2006.01)
*G06F 7/00* (2006.01)

(52) U.S. Cl.
USPC ............................ 707/791; 707/800; 715/208

(58) Field of Classification Search
USPC .................................. 707/790–811, 821–831
See application file for complete search history.

(56) References Cited

U.S. PATENT DOCUMENTS

| | | | | |
|---|---|---|---|---|
| 7,529,785 B1 * | 5/2009 | Spertus et al. ........................ 1/1 |
| 7,539,632 B1 * | 5/2009 | Chakrabarti et al. ........ 705/26.1 |
| 2006/0230076 A1 * | 10/2006 | Gounares et al. ............. 707/200 |
| 2006/0265489 A1 * | 11/2006 | Moore ........................... 709/223 |
| 2007/0061266 A1 * | 3/2007 | Moore et al. ..................... 705/51 |
| 2008/0091613 A1 * | 4/2008 | Gates et al. ...................... 705/59 |
| 2009/0276771 A1 * | 11/2009 | Nickolov et al. ............. 717/177 |
| 2009/0326981 A1 * | 12/2009 | Karkanias et al. ................ 705/3 |
| 2010/0191774 A1 * | 7/2010 | Mason et al. .................. 707/797 |
| 2010/0191783 A1 * | 7/2010 | Mason et al. .................. 707/822 |
| 2010/0199042 A1 * | 8/2010 | Bates et al. .................... 711/114 |
| 2010/0250497 A1 * | 9/2010 | Redlich et al. ................ 707/661 |
| 2010/0274772 A1 * | 10/2010 | Samuels ........................ 707/693 |
| 2010/0274816 A1 * | 10/2010 | Guzik ........................... 707/802 |
| 2010/0306267 A1 * | 12/2010 | Zamkoff et al. .............. 707/783 |
| 2010/0306772 A1 * | 12/2010 | Arnold et al. ...................... 718/1 |
| 2010/0325199 A1 * | 12/2010 | Park et al. ...................... 709/203 |
| 2010/0325276 A1 * | 12/2010 | Aarni et al. ................... 709/226 |
| 2010/0325422 A1 * | 12/2010 | Gnanasambandam et al. ............................. 713/153 |
| 2010/0332456 A1 * | 12/2010 | Prahlad et al. ................ 707/664 |
| 2010/0332530 A1 * | 12/2010 | McKelvie et al. ............ 707/770 |
| 2010/0333116 A1 * | 12/2010 | Prahlad et al. ................ 719/328 |
| 2011/0016473 A1 * | 1/2011 | Srinivasan .................... 718/105 |

* cited by examiner

*Primary Examiner* — Angelica Ruiz
(74) *Attorney, Agent, or Firm* — Patterson & Sheridan LLP

(57) ABSTRACT

Techniques are disclosed for a policy driven cloud storage management broker and a cloud storage policy router, along with methods for registering tenant applications with the cloud storage management broker and for sending (and retrieving) files to/from a cloud storage service. A tenant application may be configured to generate a user interface that allows a user to specify metadata to associate with a file along with a link to a cloud storage service to which the file is uploaded. The tenant application may collect and store the metadata attributes (along with a reference to the file stored in the cloud) in an enterprise database, while the file itself may be transmitted to the cloud storage service directly. The cloud storage policy router may learn the capabilities of different cloud storage providers using an advertisement routing protocol.

17 Claims, 9 Drawing Sheets

Cisco Storage Connect Administration

Register an Application

Name of Application: TSRT

Application Alias: tsrt

Application URL: www.cisco.com/trst

Business Owner: TS/Communication Collaboration [Lookup]

jlarsen [Lookup]

IT Owner: TS-IT [Lookup]

stliem [Lookup]

Storage Service: Cisco Storage Connect ▽

[Manage Attributes] [Manage Policies]　　　[Cancel] [Save] [Save and Exit]

POLICY DRIVEN CLOUD STORAGE MANAGEMENT AND CLOUD STORAGE POLICY ROUTER

TECHNICAL FIELD

This disclosure relates generally to networked computing systems.

BACKGROUND

The data storage requirements faced by many businesses continue to increase. For example, computer hardware manufactures frequently use computer database systems to track service requests from customers. If such a database allows customers to supply data files (e.g., screenshots, configuration files) related to a particular service request, then the storage requirements for such a database simply grow over time. Cloud computing allows users to perform computing tasks where data, applications, and even complete virtualized computing systems are accessed over computer networks (frequently, e.g., the Internet). The network of servers and connections used to provide a computing service is generally referred to as "the cloud." Cloud storage provides an abstraction for physical storage devices. Cloud storage generally involves delivering data storage as a service, often billed on a usage basis. That is, cloud storage allows users to store and access data files somewhere in "the cloud," without knowing the details of where files are stored or having to manage physical storage devices. In cloud storage, capacity can be available on demand and files can be made available on a global basis.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4C illustrate example screen interfaces used to register a tenant application with a cloud storage management broker or a cloud storage policy router, according to one embodiment.

OVERVIEW

Figure 1:
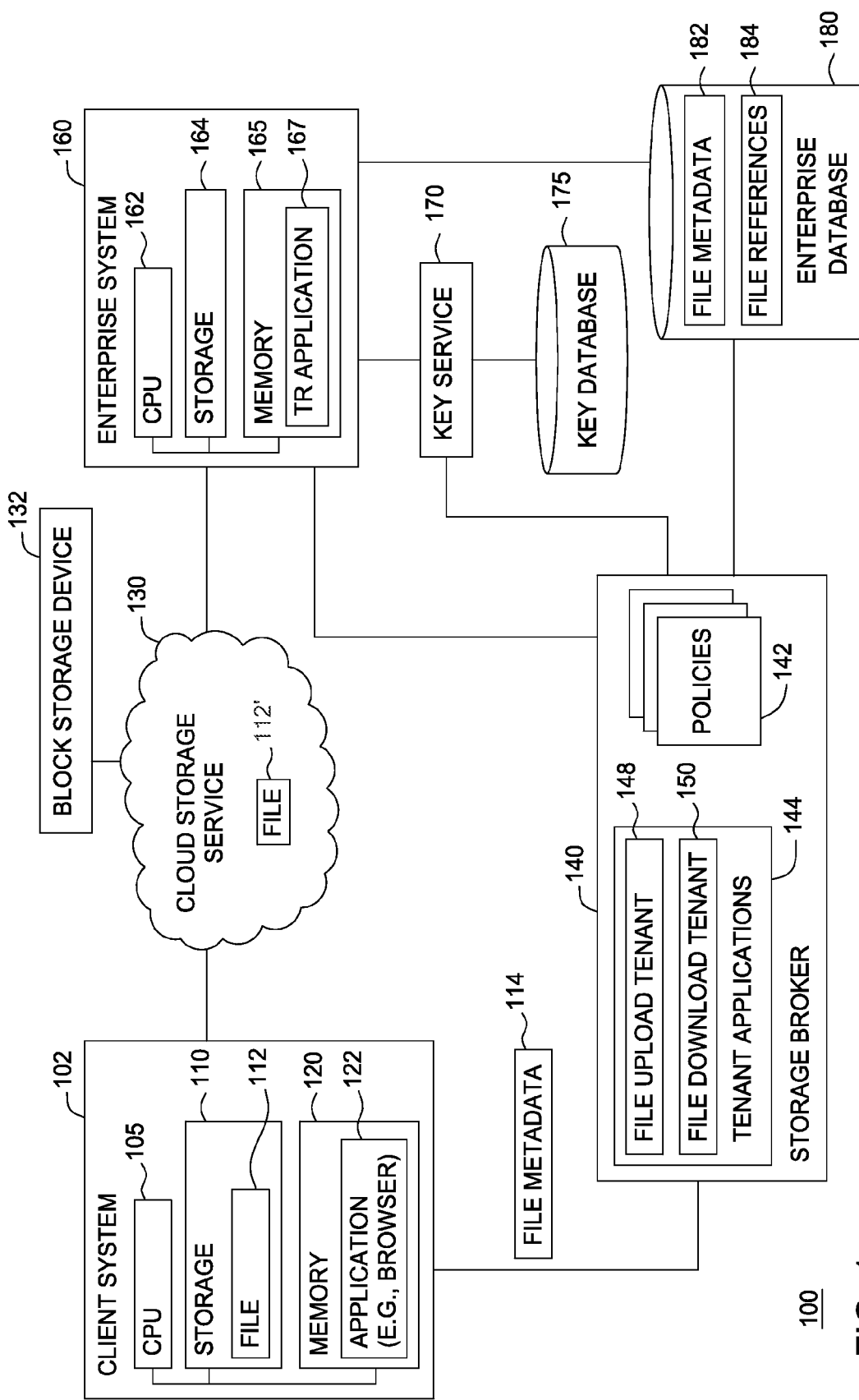
FIG. 1 illustrates a computing environment which includes a policy driven cloud storage management broker, according to one embodiment.

One embodiment described herein includes a computer-implemented method for storing a file. The method may generally include receiving a request to store the file using a cloud storage service. The request may be received by a tenant application hosted on a storage broker. The method may generally include identifying one or more metadata attributes to associate with the file, generating a user interface configured to prompt a user to supply values for the one or more metadata attributes, and generating a network link configured to allow the user to upload the file to the cloud storage service. The method may further include transmitting the network link and the user interface to the user's computer system, receiving the metadata

DESCRIPTION

Certain embodiments described herein provide techniques for policy driven cloud storage management and for a cloud storage policy router. As described, the storage broker may provide real time service negotiation and dynamic cloud storage management for multiple tenant applications registered with the broker. A file upload tenant may be configured to generate a user interface that allows a user to specify metadata to associate with a file along with a link to a cloud storage service to which the file is uploaded. A link to the file and the metadata may be stored in an enterprise database.

In one embodiment, a software application (referred to as a tenant application) may be registered with the storage broker. The tenant application may be configured to generate a user interface with graphical interface components used specify metadata attributes to associate with a file uploaded to a cloud storage service. For example, the tenant application may provide a web service configured to generate the appropriate HTML content to render an interface on a web browser. In such a case, the HTML content may include form elements used to enter and submit the metadata to associate with a file stored in cloud storage by a particular tenant application. The broker may determine, based on the metadata (or the particular tenant application), an appropriate cloud storage vendor/location and provide an address for that location. A network link to the file and the metadata may be stored in an enterprise database. Thus, the user interface provided by the tenant application allows the user to transfer files to a cloud storage service suitable for the needs of a particular case. As noted, demand for storage capacity is only part of the problem. In order for files to be searched, located, retrieved, or intelligently mined for knowledge, meaningful metadata should be associated with files stored in "the cloud." Accordingly, in one embodiment, the broker collects and stores the metadata attributes (along with a reference to the file stored in the cloud) in an enterprise database. At the same time, the file itself may be transmitted to the cloud storage service directly.

In another embodiment, a cloud storage policy router (or more simply just router or routing device) may act as a proxy for multiple cloud storage locations. In such a case, the cloud storage policy router may receive service level/capability advertisements from multiple cloud storage services, as well as provide a web-services style interface allowing a client application to upload a file along with requested storage attributes. When a user uploads a file and a set of storage requirements, the cloud storage policy router matches the requirements with the capabilities of different cloud storage providers. Once a cloud storage service is determined, the routing device then forwards the file to that cloud storage service. If no cloud is available that satisfies the requirements for a given file or application, the cloud storage policy router may simply fail the storage request. The routing device may notify the sender of the selected cloud storage service (as well as store the metadata attributes associated with the file uploaded to the cloud storage service). Thus, the cloud storage policy router may provide real time service negotiation and dynamic cloud storage management.

As stated, the cloud storage policy router may select a cloud storage service based on the requirements for storage submitted with a file. For example, the requirements may allow an enterprise to specify any geopolitical, business, or regulatory requirements associated with storing data files faced by a given enterprise. For instance, the United States Patriot Act has resulted in some non-US localities to pass legislation forbidding data storage within the United States. (See, e.g., British Columbia, Freedom of Information and Protection of Privacy Act "FOIPPA," Oct. 21, 2004). In such a case, the cloud storage policy router may enforce a policy that prevents data files from being stored in a particular jurisdiction. Alternatively, the cloud storage policy router may enforce a requirement that data files remain stored within a particular jurisdiction. Similarly, the policy may allow an enterprise to specify a variety of other business or regulatory processes related to where data records are stored and how they may be accessed. Examples of how files may need to be stored include encryption requirements, audit, and file storage metadata requirements, etc. Examples of regulatory requirements include HIPPA (healthcare privacy), PCI (card transaction security), Gramm-Leach-Bliley (financial consumer privacy). Examples of business processes include internal information security restrictions (e.g., a requirement to encrypt files based on a particular data classification) or data retention requirements (i.e., how long a file should be stored with the cloud storage service before being purged).

Further, in one embodiment, the cloud storage policy router and the broker may be used to complement one another. For example, a tenant application may not itself specify a cloud storage location, and instead rely on the policy router. In such a case, the tenant application may collect a set of attributes or requirements for that tenant application, and forward this information along with the file to be stored to the policy router. In turn, the policy router makes a decision of where to store the file. For example, the cloud storage policy router may evaluate the attributes against the advertised capabilities of multiple cloud storage routers. That is, the broker collects the appropriate metadata and the router selects the cloud storage service. Thus, the broker and storage policy router effectively operate as an end-to-end file exchange, where users submit files for storage with a set of requirements to the broker and the router can then locate those files at the best available cloud storage.

The application programs (e.g., the cloud storage management broker) disclosed herein may be distributed on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. The latter embodiment specifically includes transmitting information to/from the Internet and other networks. For example, as described in greater detail herein, one embodiment includes a computer-readable storage medium containing a program, which when executed on a processor is configured to send/retrieve files to/from cloud storage services using a tenant application registered with a management broker (or a cloud storage policy router).

Other forms of media include communications media through which information is conveyed to a computer, such as through a computer or telephone network, including wireless communications networks.

FIG. 1 illustrates a computing environment 100 which includes a policy driven cloud storage management broker 140, according to one embodiment. As shown, the computing environment 100 includes a client system 102, a cloud storage service 130, the storage broker 140, an enterprise system 160, a key service 170 and key database 175, and an enterprise database 180.

Client system 102 is included to be generally representative of a computing system having a processor, a memory, and storage devices, etc. Alternatively, client system 102 may be a virtualized system accessed using a remote desktop facility over a network. As shown, the computing system 102 includes a central processing unit (CPU) 105 connected to storage 110, and memory 120. CPU 105 is included to be representative of a single CPU, multiple CPUs, a single CPU having multiple processing cores, and the like. Storage 110 stores application programs and data for use by the client system 102. The computing system 100 may be connected to a data communications network such as a local area network, which itself may be connected to other networks such as the Internet. Of course, client system 105 may also be other computing platforms having a processor, memory, and storage for applications and data, e.g., a PDA, netbook PC, and the like.

Illustratively, the memory 120 stores an application 122, such as a web browser, and the storage 120 includes a file 112. The file 112 itself is included to be representative of any object on client system 102 that is to be stored in the stored in the cloud storage service 130, such as a word processing document, structured document (e.g., an XML file), spreadsheets, database records, audio/video files, etc.

In one embodiment, a user interacts with the application 122 to access a tenant application 144 hosted by the storage broker 140. The storage broker 140 may provide a software application, e.g., a combination of an application server, a web server, and a database. As shown, the storage broker 140 hosts both a file upload tenant 148 and a file download tenant 150. In this example, assume that the file upload tenant 148 allows a user to attach the file 112 to a service request submitted to a computer hardware vendor (e.g., a configuration file associated with the user's computer hardware). And assume that the file download tenant 150 allows a user of the enterprise system 160 to access the file from the cloud storage service 130 and the associated file metadata as part of processing the service request. In such a case, the user may access the file upload tenant 148 to upload the file 112 to the cloud storage service 130. Once uploaded, the cloud storage service 130 may store the file 112' on a block storage device 132 (or some other form of physical storage).

In one embodiment, the file upload tenant 148 may be configured to generate a user interface (e.g., a web page) rendered by the application 122 on client system 102. Such an interface allows the user to specify the file metadata 114 to associate with the file 112. Further, the file upload tenant 148 may provide a network link (e.g., a URL) used to upload the file 112 to the cloud storage service 130. The particular cloud service 130 may be specified as part of the configuration of the file upload tenant 140. Alternatively, the cloud service 130 may be determined dynamically using policies 142. For example, the file metadata 114 specified by the user may indicate a particular file type being uploaded, and the file upload tenant may select what cloud storage service 130 to send the file based on the file metadata 114. The application 122 may send the file metadata 114 to the storage broker 140, which in turn, stores the file metadata 114 in the enterprise database 180 (shown in FIG. 1 as file metadata 182). Thus, as shown, the enterprise database 180 includes the file metadata 182 and a file reference 184. The reference 184 provides a network link to the particular file 112' stored by the cloud storage service 130.

Further, the particular policy 142 for the file upload tenant 148 may require that the file 114 be encrypted prior to being uploaded to the cloud storage service 130. Accordingly, in one embodiment, the storage broker 140 and file upload tenant 148 may be configured to communicate with the key service 170 to obtain an encryption key to supply with the user interface provided to the client application 122. The encryption key may be a symmetric key (i.e., a single key which both encrypts and decrypts the file 112) or an asymmetric key (i.e., a public key of a public/private key pair). The keys used to encrypt such files (or the private key of a key pair) may be stored in the key database 175. This approach allows each file updated to the cloud storage service 130 to be encrypted using a distinct key (or key pair), while allowing the enterprise to maintain the security of the key service 170 and key database 170.

Continuing with the example of a service request for a computer hardware vendor, the enterprise system 160 includes a CPU 162, storage 164, and a memory 165. Further, the memory 165 includes a ticket response (TR) application 167 used to evaluate service requests submitted by users of the client system 102. In one embodiment, the TR application 167 may be configured to access the file metadata 182 and the corresponding file reference 184 from the enterprise database 180. Using this information, the TR application 167 may retrieve the file 112' from the cloud storage service 130, allowing the service requested submitted by client system 102 to be processed. Further, if the file 112' is encrypted, the TR application may retrieve the appropriate encryption from the key service 170 and the key database 175. In this example, the TR application 167 retrieves the file 112' from the cloud service 130 directly.

Alternatively, however, the TR application 167 may be configured to interact with one of the tenant applications 144 registered with the storage broker 140. For example, the TR application may supply the file download tenant 150 with a request for access to a particular file stored in cloud storage service 130. In response, the file download tenant 150 may generate a link to the requested file using, e.g., the file metadata 182.

Figure 2A:
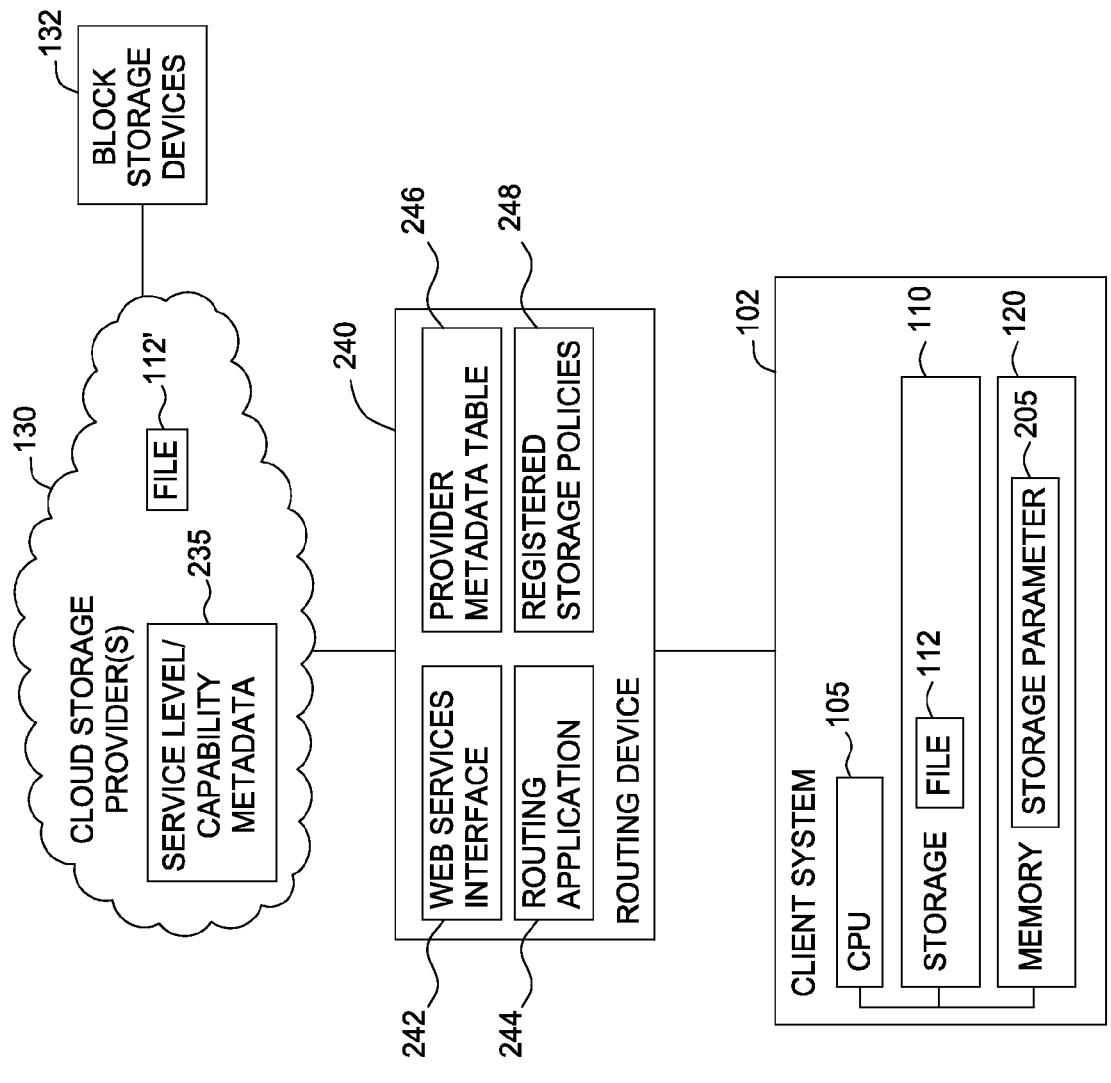
FIGS. 2A-2B illustrate a computing environment which includes a cloud storage policy router, according to one embodiment.

FIG. 2A illustrates a computing environment 200, which includes a cloud storage routing device, according to one embodiment. As shown, the computing environment 200 includes a cloud storage policy router 240 (or more simply, just "routing device" 240) configured to interact with the client system 102 and multiple cloud storage providers 230. The client system 102 shown in FIG. 2A generally corresponds to the client system 102 described relative to FIG. 1. In this example, however the memory 120 of the client system 102 includes a set of storage parameters 205. The storage parameters 250 may be used to specify what characteristics are desired from a cloud storage provider 230 selected to store the file 112.

Illustratively, the routing derive 240 includes a web services interface 242, a routing application 244, a provider metadata table 246, and registered storage policies 248. In one embodiment, the web services interface 242 allows the client system 102 to connect to the routing device 242 and provide it the storage parameters 205 indicating preferences for storing the file 112 with a cloud storage provider 130.

Further, the routing application 244 may be configured to evaluate the storage parameters 205 received from client system 102 using the provider metadata table 246. More specifically, the routing application 244 may compare the requested storage parameters 205 with the capabilities advertised by the different cloud storage providers 230, and optionally, the registered storage polices 248, to select a particular cloud storage provider 120 to store the file 112. For example, the requested storage parameters 205 may indicate a minimum guaranteed service level availability (SLA) that the selected cloud storage provider 230 should have to be selected to store the file 112. Similarly, one of the registered storage policies 248 may indicate whether the file 112 should be encrypted before being stored by the cloud storage provider 230 or indicate what locations are allowed (or prohibited) for storing a file using one of the cloud storage providers 230. The registered storage policy 248 may be based on the particular client system 102 making the request to store the file 112 or the particular storage parameters 205 included with the request. Further, in one embodiment, the routing device 240 may query multiple cloud storage providers 230 to identify the capabilities or characteristics of different cloud storage providers 230. For example, the cloud storage providers 230 may advertise service level and capability metadata 235.

Once the routing application 244 selects a cloud storage provider 230, the routing device 240 receives the file 112 and makes a forwarding decision to route the file towards the selected cloud storage provider 130. Once uploaded, the cloud storage provider 130 may store the file 112' on a block storage device 132 (or some other form of physical storage). Further, the routing application 244 may send a confirmation back to the client system 102, along with a link used to access the file at the selected cloud storage provider 240. If no cloud storage provider 230 satisfies the storage parameters 205, then the routing application 244 may simply send an indication to the client system 102 that no adequate cloud storage provider 230 is available to store the file 112. In one embodiment, the indication may specify what parameters could (or could not) be satisfied or suggest alternative storage parameters that could be satisfied. Alternatively, the routing device 240 may make a forwarding decision to send the file 112 to a non-cloud storage location, e.g., to a physical storage device managed by the enterprise using the routing device 240.

Figure 2B:
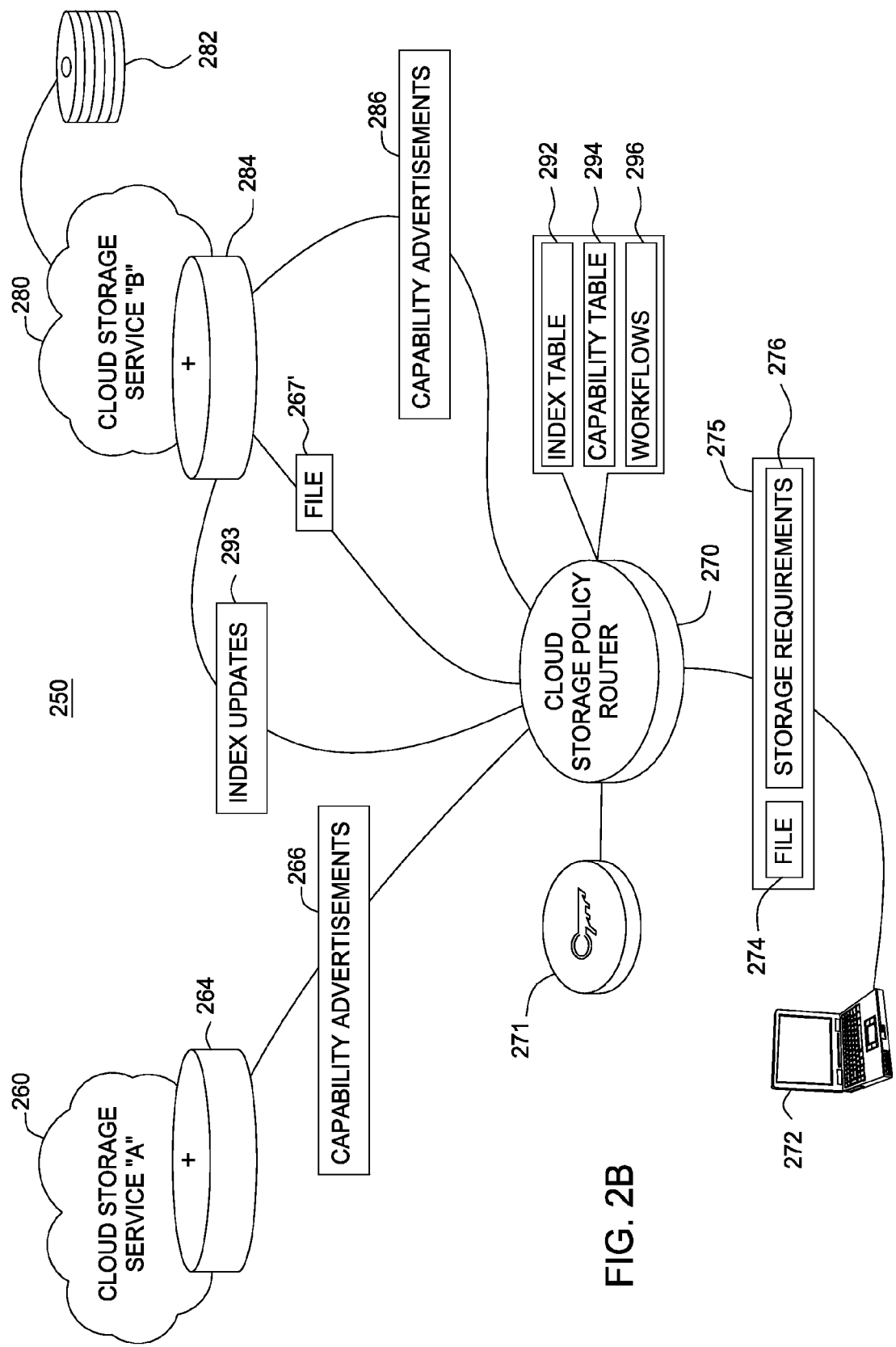

FIG. 2B illustrates an additional example of a cloud storage policy router being used to make forwarding decisions for file storage based on a set of requirements for a given file and the advertised capabilities of multiple cloud storage service providers, according to one embodiment. As shown, a computing environment 250 includes a cloud storage policy router 270, which acts as a proxy for a cloud storage service "A" 260 and a cloud storage service "B" 280. In this example, a user interacts with an application executing on computer 272 to specify a file 274 to be stored using a cloud storage service that satisfies a stated set of storage requirements 276. In one embodiment, the user may specify the storage requirements 276 by interacting with a web service, such as a registered tenant application. Of course other mechanisms may be used. The storage requirements 274 allow a user (or an application) to specify any geographical, business, regulatory, or other requirements associated with storing data files faced by a given enterprise. As noted above, examples of storage requirements 276 include a requirement that a file be stored at a particular location (or exclude a particular location), encryption requirements or capabilities of a cloud storage service, or service level requirements, such as a minimum guaranteed availability of a cloud storage service, on in the case of third party cloud storage service, price.

Once the policy router 270 receives a storage request 275, which includes the file 274 and the storage requirements 276 for that file, it may match the requirements against capability advertisements 266 and 286 received from multiple cloud storage providers. In one embodiment, the cloud storage providers 260 and 280 may be managed by a common enterprise. For example, an enterprise may operate multiple data centers at different locations, each providing a cloud storage service to local clients. Doing so may allow the enterprise to localize cloud storage near the ultimate consumers of data files stored therein. Alternatively, the policy router 270 may provide a proxy for independently operated cloud storage providers. For example, a cloud storage service may be made as a commercial offering by a variety of different service providers. In such a case, the cloud storage service may advertise its capabilities to the policy router 270. Thus, multiple cloud storage services may compete with one another, e.g., based on price and service levels.

In one embodiment, the policy router 270 may store the capability advertisements 266 and 286 received from the cloud service providers 260 and 280 in a table (labeled in FIG. 2B as capability table 294). Further, the capability table 294 may be dynamic. That is, the capabilities of a given cloud storage service may change over time, and the cloud service may update its advertised capabilities as such changes occur.

As stated, the policy router 270 may select a cloud storage provider at which to store file 270 by matching the storage requirements 276 against the capability table 294. If no provider can satisfy the storage requirements 276, then the policy router 270 may simply fail the storage request 275 and notify the appropriate application executing on computer 272. In the example shown in FIG. 2B, however, assume the policy router 270 selects to store file 274 at the cloud storage provider "B" 280 (represented in FIG. 2B as file 267' being transmitted to storage provider 280). In one embodiment, the storage policy router 270 may communicate with the selected cloud storage provider using a web services type interface, e.g., the policy router 270 may transmit the file 267' using an HTTP post command to a web service deployed by web service provider 280 on storage router 284. Once received by a storage router 284 at cloud service 280, the file 267' may be stored on whatever underlying physical storage mechanisms are used by cloud service 280 (e.g., disk array 282).

Additionally, in this example, assume the file 267' has been encrypted using a key from key server 271. In one embodiment, the key used to encrypt file 267' may be a device level encryption key used by policy router 270 to encrypt each file sent to a cloud storage provider. For example, the policy router 270 may be acting as a proxy for multiple cloud storage services managed by a common enterprise. In such a case, policy router 270 and storage routers 264 and 284 at cloud storage providers 260 and 280 may share a device level encryption key.

In one embodiment, the cloud storage policy router 270 may store an index of what files have been sent for storage to a given cloud storage location, shown in FIG. 2B as index table 292. That is, when the policy router 270 sends the file 267' to the storage cloud 280, the policy router 270 may update the index table 292 to reflect that file 267' was sent to cloud storage service 280 for storage. More generally, the index table 292 may include a file ID and a customer ID (or application ID) for each file sent to a cloud storage provider. Further, the policy router 270 may send an update of the index table 292 to the application which sent a given file for storage. That is, each time a file is written to cloud storage, the policy router 270 may return a message to the application submitting the storage request 275. Such a message may be used to update a list of files sent to cloud storage over the policy router 270.

Further, this information (i.e., index table 192) may be shared among multiple storage routers, e.g., for performance, scalability, and disaster recovery reasons. For example, peer routers may restore the index table 192 in the event that policy router 270 experiences a non-recoverable error and is rebooted. Further, additional storage policy routers may be added to an enterprise network topology and configured (e.g., with a network address) and the addresses of the available cloud storage services (e.g., IP addresses of storage routers 264 and 284) to provide scalability and load balancing services among multiple policy routers 270 deployed for an enterprise network topology. In such a case, a newly added policy router may replicate an index table from other peer routers.

Further still, in one embodiment, the policy router 270 may be configured to perform one or more workflows 296 on files submitted to the policy router 270 for storage. Each workflow 296 may specify an action to perform on files included in a storage request (e.g., storage request 276). For example, a workflow 296 could evaluate a file for any prohibited (or required) content for files to be forwarded to cloud storage by the policy router 270. In the event that a workflow 296 determined that a file should not be forwarded to cloud storage by the policy router 270, then the workflow 296 could fail the cloud storage request and return an error message to the requesting application. Doing so may help prevent user mistakes and enforce enterprise policy requirements related to what files are allowed to be submitted to the cloud storage policy router 270.

Figure 3:
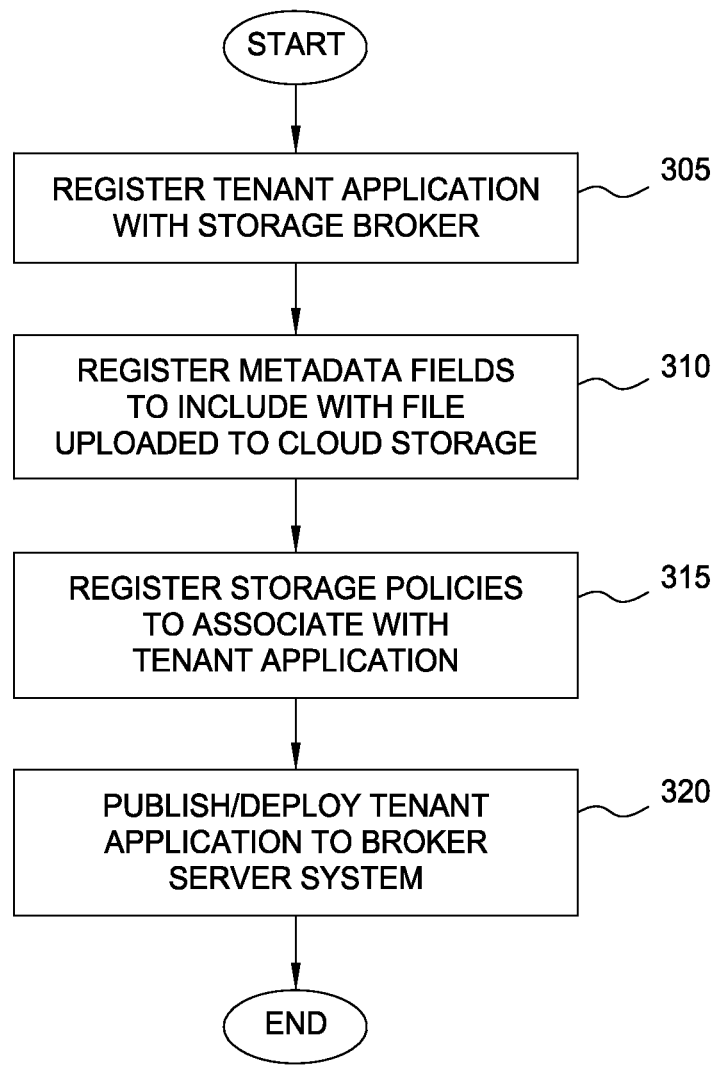
FIG. 3 illustrates a method for configuring a cloud storage management broker with a tenant application, according to one embodiment.

FIG. 3 illustrates a method 300 for configuring a cloud storage management broker with a tenant application, according to one embodiment. As shown, the method 300 begins at step 305 where a user registers a tenant application with the storage broker. The user may specify a particular cloud storage service to which files may be uploaded to (or retrieved from) cloud storage using that tenant application.

Figure 4A:
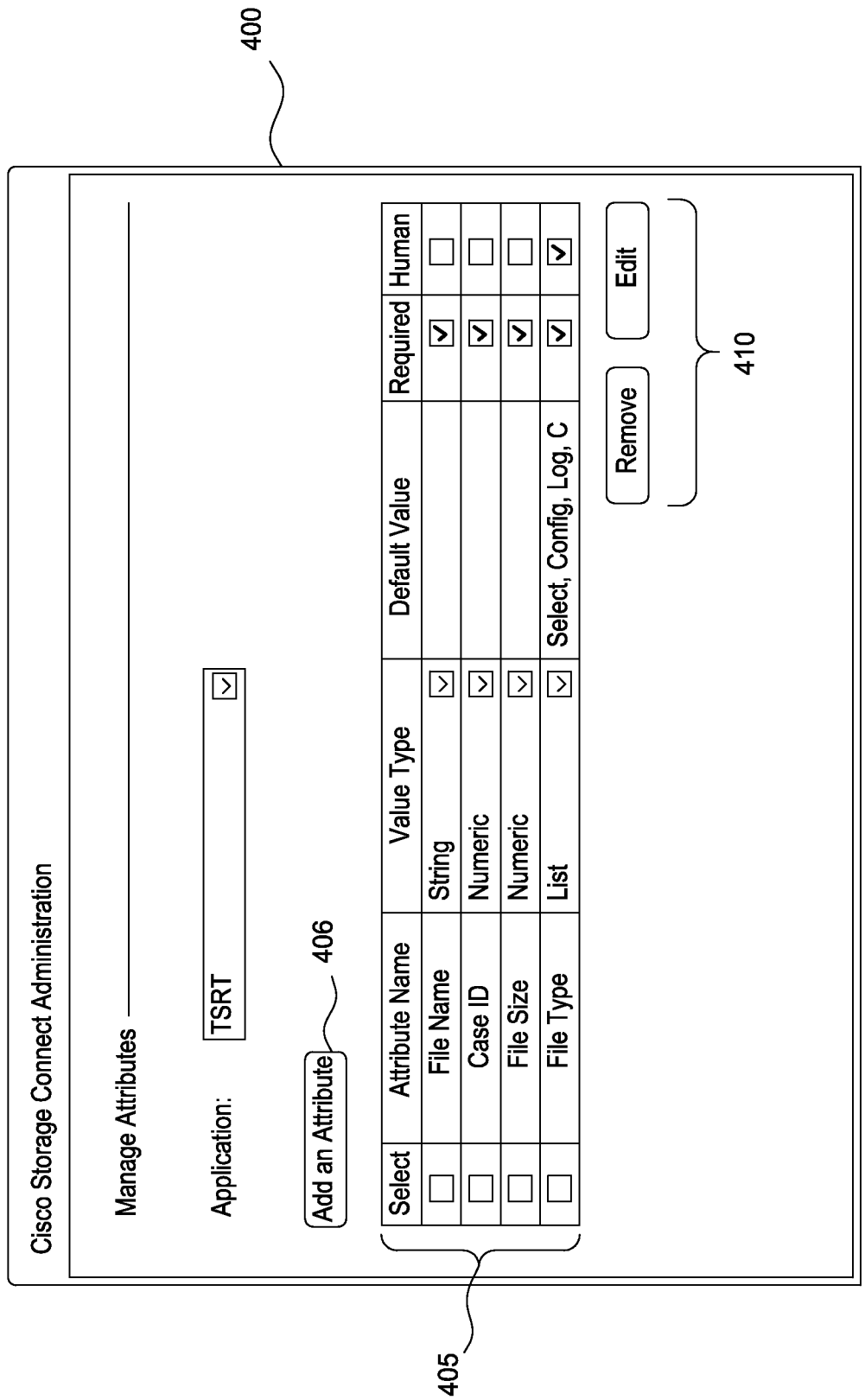

At step 310, the user may register metadata fields to supply for files uploaded to the cloud storage service identified at step 305. For example, FIG. 4A illustrates an example interface 400 for specifying a collection of metadata attributes 405 to associate with files uploaded to cloud storage using the example service request tenant application described relative to FIG. 1. As shown, the interface 400 includes a name of "TSRT" for the tenant application being registered. The interface 400 also includes four attributes 405 for files uploaded using the "TSRT" application. Illustratively, the attributes 405 include a file name attribute, a case ID attribute, a file size attribute, and a file type attribute. In addition to a name, each attribute 405 also includes a data type, and optionally a default value and an indication of whether a given attribute is required. Further the interface 400 allows the user to add additional attributes using an add attribute button 406 or remove or edit a selected attribute using buttons 410. In this example, the metadata attributes 405 are consistent with what metadata would be useful for a tenant application used to upload files associated with service requests for computer hardware. Of course, one of ordinary skill in the art will recognize that the particular metadata attributes may be tailored to suit the needs of a particular case.

Figure 4B:
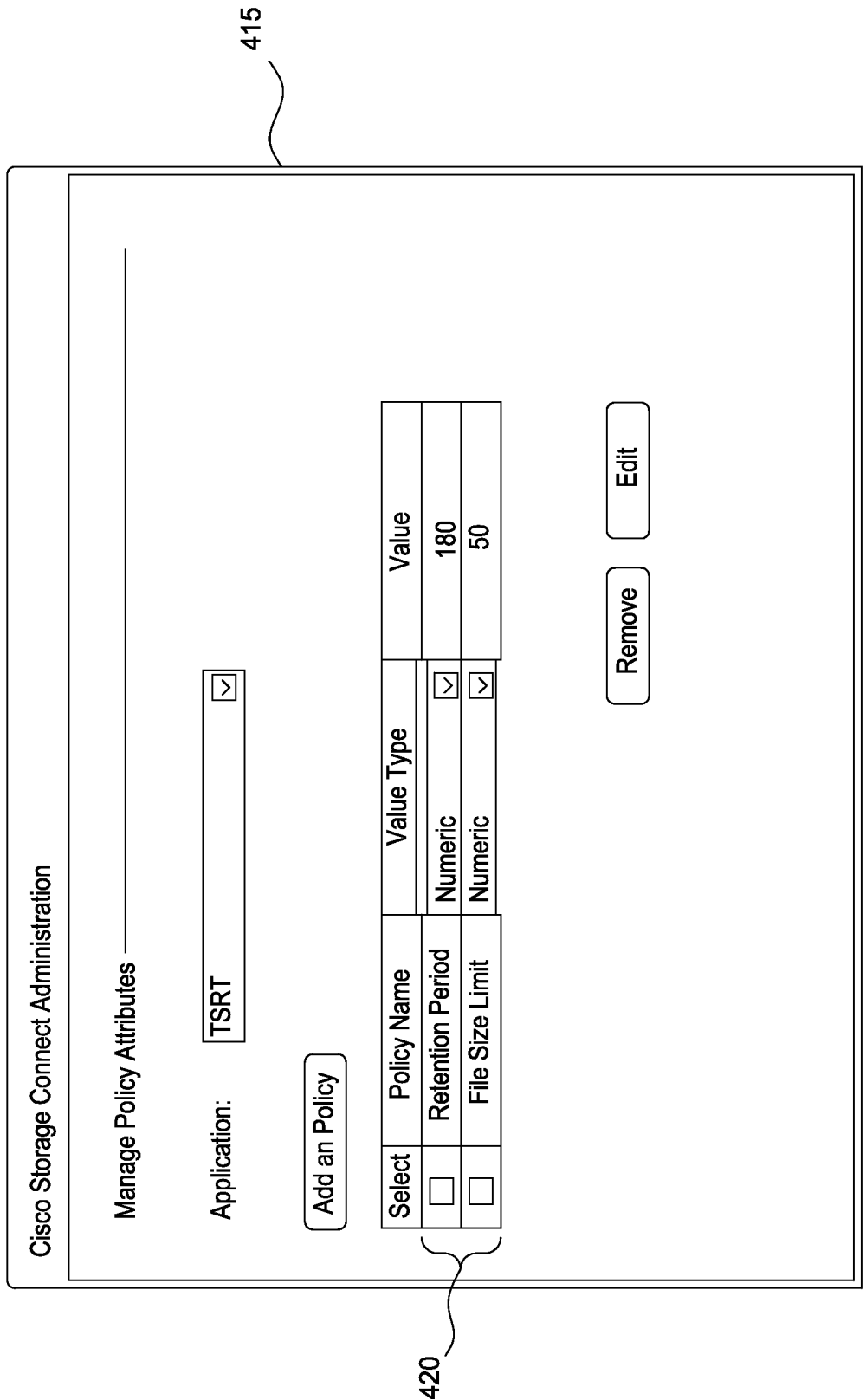

At step 315, the user may register storage policies to associate with the tenant application identified at step 305. For example, as described above, a registered policy may specify whether files need to be encrypted prior to being uploaded to the storage service or may specify a retention policy specifying how long a file should be stored by the cloud storage service before being deleted. For example, FIG. 4B illustrates an example interface 415 used to specify what storage policies to associate with the tenant application being registered. In this particular example, the policies 420 being registered using interface 415 include a retention policy and a file size limit policy. Additionally, like interface 400, the interface in FIG. 4B allows users to add, remove, and edit additional storage policies to associate with the tenant application being registered.

At step 320, the user may publish/deploy the tenant application to the storage broker. For example, the broker may include an application server, a web server, and a database. In such a case, the user may provide an application package configured according to the requirements of the application server. FIG. 4C provides an example interface 425 for registering a tenant application with the cloud storage broker. As shown, the interface 425 allows the user to specify the name of the tenant application ("TSRT" in this example) as well as an application URL ("www.cisco.com/tsrt") at which clients may access the registered tenant service. The interface 425 allows the user to specify a variety of other attributes, including the particular storage service to which files are uploaded using this tenant application ("Cisco Storage Connect" in this example). Additionally, the interface 425 includes controls used to manage the properties for the tenant application being deployed. For example, the user may return to the interface 400 of FIG. 4A or the interface 15 of FIG. 4B using buttons 430. The user may cancel, save (or save and exit) using buttons 435. Once saved, the tenant application may be deployed to the storage broker.

Figure 5:
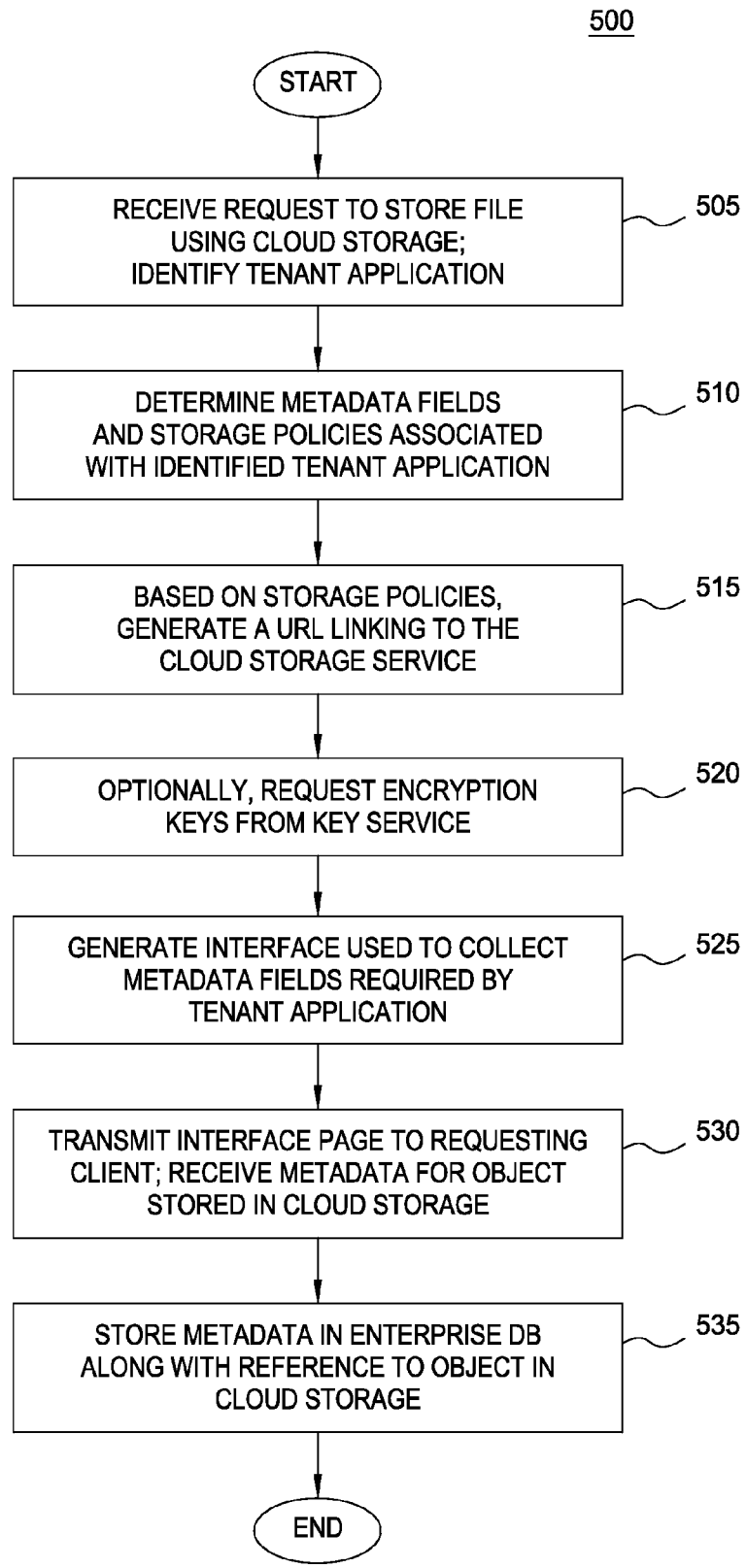
FIG. 5 illustrates a method for sending a file to a cloud storage service using a tenant application registered with a management broker or a cloud storage policy router, according to one embodiment.

FIG. 5 illustrates a method 500 for sending a file to a cloud storage service using a tenant application registered with a management broker, according to one embodiment. As shown, the method 500 begins at step 505, where the storage broker receives a request to store a file using cloud storage. In response, the storage broker identifies a tenant application corresponding to the request.

At step 510, the tenant application may identify what metadata fields are needed for a file uploaded to the cloud storage service. Additionally, the tenant application may identify any storage policies associated with the tenant application (or the user/application making the request). At step 515, the tenant application may generate a URL linking to the cloud storage service. The requesting client may use the URL to upload the file to the cloud storage service. At step 520, the tenant application may interface with a key service to obtain an encryption key used by the client application to encrypt a file prior to being uploaded to the cloud storage service.

At step 525, the tenant application on the storage broker generates an interface used to collect the metadata fields required by the tenant application. For example, the tenant application may generate a web page with form entries, drop-down boxes, check boxes, etc., rendered on a web browser at the client. Once generated, the tenant application may transmit the interface page to the requesting client, where it is rendered for display (step 530). As noted, the interface may include the appropriate constructs for the user to supply values for the metadata files. Additionally, the interface transmitted to the client may also include a link used to upload the file to the cloud storage service associated with the tenant application. The interface may also include an encryption key used to encrypt the file prior to being uploaded to cloud storage. If so, the encryption key (or the private key counterpart to a public key) may be stored in a database.

After the user supplies values for the metadata fields, and potentially encrypts the file, the file may be uploaded to the cloud storage service. Additionally, a confirmation may be transmitted to the tenant application that the file has been stored in "the cloud."

At step 535, the tenant application may store the metadata fields for the file in an enterprise database, along with a reference to the file in cloud storage. Thus, individuals within the enterprise have access to the file from the cloud storage service, without incurring the physical storage or maintenance requirements for storing the file directly.

Figure 6:
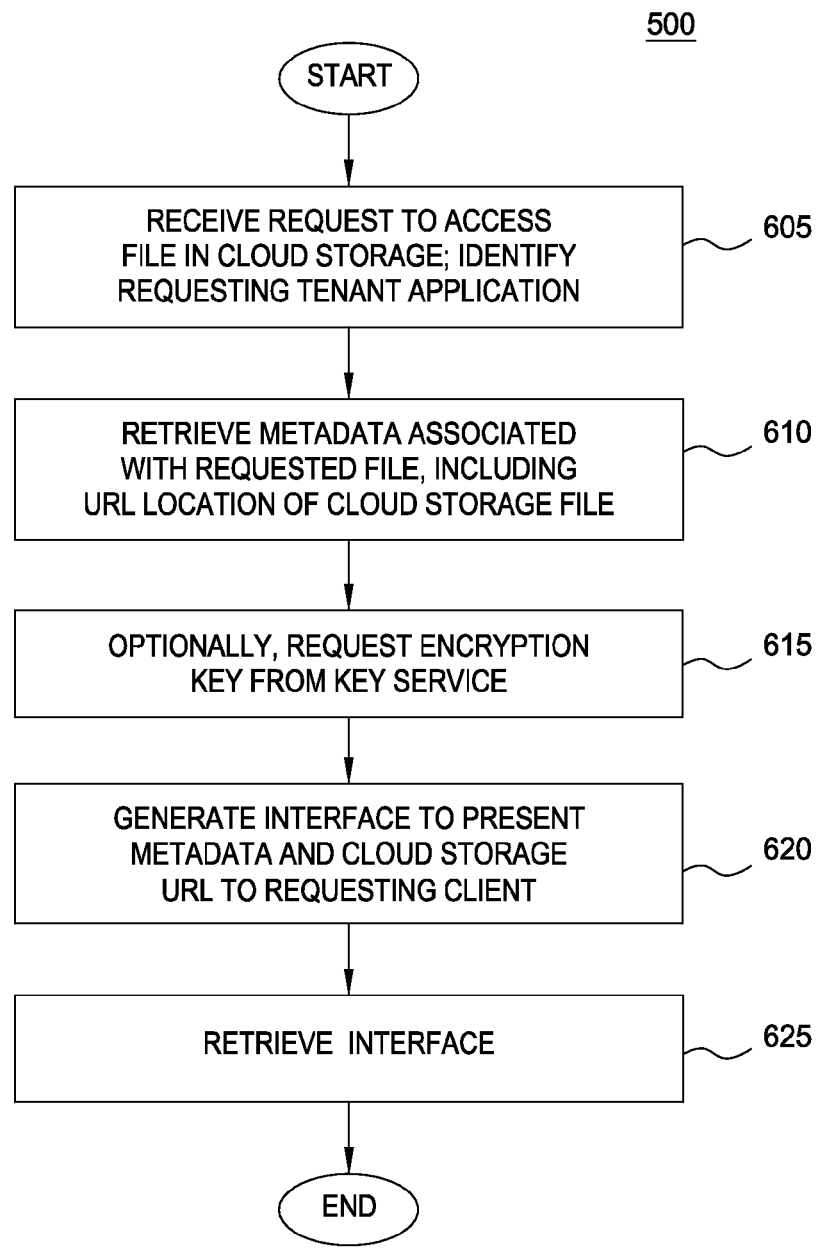
FIG. 6 illustrates a method for retrieving a file stored by a cloud service along with metadata related to the file not stored by the cloud service, according to one embodiment.

FIG. 6 illustrates a method 600 for retrieving a file stored by a cloud service along with metadata related to the file not stored by the cloud service, according to one embodiment. As shown, the method 600 begins at step 605 where a user requests to access to both a file stored by a cloud service and metadata associated with the file. Again returning to the example of the computer hardware vendor, support personnel may be tasked with resolving service requests submitted by customers using the file upload tenant described relative to the FIG. 1 and FIG. 5. In such a case, the support personnel may be provided with a ticket review application (e.g., the TR application 167 described relative to FIG. 1). Further, in one embodiment, the ticket review application may access a file download tenant registered with the storage broker. Alternatively, the ticket review application may retrieve a service request, file metadata, and a link to a corresponding file stored by the cloud service. In either case, at step 610, the ticket review application (or download tenant) retrieves metadata associated the requested file, including a link (e.g., a URL) used to retrieve the file from the cloud storage service. If the file has been encrypted prior to being stored with the cloud service, then at step 615, the keys needed to decrypt the file are retrieved from the key service.

At step 620, the download tenant application (or the ticket review application) generates an interface presenting the metadata and cloud storage link to the requesting client. At step 625, the file may be retrieved from the cloud storage provider using the link. Once retrieved, the user may then access the information stored in the file retrieved from the cloud storage service.

Advantageously, embodiments described herein provide techniques for policy driven cloud storage management and for a cloud storage policy router. As described, a storage broker may provide real time service negotiation and dynamic cloud storage management for multiple tenant applications registered with the broker. A file upload tenant may be configured to generate a user interface that allows a user to specify metadata to associate with a file along with a link to a cloud storage service to which the file is uploaded. A link to the file and the metadata may be stored in an enterprise database. Thus, the user interface allows the user to transfer files to a cloud storage service suitable for the needs of a particular case, as well as allows the enterprise to receive any number of metadata attributes describing the contents of the file stored by the cloud service. That is, the tenant application may collect and store the metadata attributes (along with a reference to the file stored in the cloud) in an enterprise database, while the file itself may be transmitted to the cloud storage service directly.

While the foregoing is directed to embodiments of the present disclosure, other and further embodiments of the disclosure may be devised without departing from the basic scope thereof, and the scope thereof is determined by the claims that follow.

The invention claimed is:
1. A computer-implemented method for storing a file, comprising:

receiving, from a requesting client, by a tenant application hosted on a storage broker hosting applications of multiple tenants, a request to store the file using a cloud storage service;

identifying one or more metadata attributes to associate with the file;

generating a graphical user interface configured to prompt the requesting client to supply values for the one or more metadata attributes;

transmitting the generated graphical user interface to the requesting client;

receiving values for the metadata attributes;

selecting one of a plurality of cloud storage services to store the file based on a storage policy associated with the tenant application and the received values for the metadata attributes;

transmitting a link to the requesting client used to upload the file to the selected cloud storage service;

forwarding the received values for the metadata attributes to the selected cloud storage service to be stored with the file; and storing, in a database system, the received values for the metadata attributes and a reference to the file, wherein the reference provides a link to the file stored by the selected cloud storage service.

2. The method of claim 1, further comprising, prior to storing the received values for the metadata attributes, receiving a confirmation that the file has been uploaded to the selected cloud storage service, wherein the confirmation includes the reference to the file.

3. The method of claim 1, further comprising, transmitting an encryption key to the requesting client, wherein the file is encrypted using the encryption key prior to being uploaded to the selected cloud storage service.

4. The method of claim 1, wherein the reference to the file stored in the database comprises a reference used to access the file from the cloud storage service.

5. The method of claim 1, wherein the storage policy specifies at least one of a regulatory requirement, a data retention requirement, a location requirement, and a service availability requirement for the selected could storage service.

6. A system, comprising,
a processor;
a network interface; and
a memory containing a multi-tenant storage broker, which, when executed on the processor, performs an operation for storing a file, the operation comprising:
receiving, over the network interface, a request from a client to store the file using a cloud storage service,
identifying one or more metadata attributes to associate with the file,
generating a graphical user interface configured to prompt the requesting client to supply values for the one or more metadata attributes,
transmitting the generated graphical user interface to the requesting client;
receiving values for the metadata attributes,
selecting one of a plurality of cloud storage services to store the file based on a storage policy associated with a tenant application and the received values for the metadata attributes;
transmitting a link to the requesting client used to upload the file to the selected cloud storage service;
forwarding the received values for the metadata attributes to the selected cloud storage service; and
storing, in a database system, the received values for the metadata attributes and a reference to the file stored by the selected cloud storage service.

7. The system of claim 6, wherein the operation further comprises, prior to storing the received values for the metadata attributes, receiving a confirmation that the file has been uploaded to the selected cloud storage service, wherein the confirmation includes the reference to the file.

8. The system of claim 6, wherein the operation further comprises, transmitting an encryption key to the requesting client, wherein the file is encrypted using the encryption key prior to being uploaded to the selected cloud storage service.

9. The system of claim 6, wherein the reference to the file stored in the database comprises a reference used to access the file from the selected cloud storage service.

10. The system of claim 6, wherein the storage policy specifies at least one of a regulatory requirement, a data retention requirement, a location requirement, and a service availability requirement for the selected cloud storage service.

11. A computer-readable storage medium containing a program, which, when executed on a processor, performs an operation for storing a file, the operation comprising:
receiving, over the network interface, a request from a client to store the file using a cloud storage service;
identifying one or more metadata attributes to associate with the file;
generating a graphical user interface configured to prompt the requesting client to supply values for the one or more metadata attributes;
transmitting the generated graphical user interface to the requesting client;
receiving values for the metadata attributes;
selecting one of a plurality of cloud storage services to store the file based on a storage policy associated with a tenant application and the received values for the metadata attributes;
transmitting a link to the requesting client used to upload the file to the selected cloud storage service;
forwarding the received values for the metadata attributes to the selected cloud storage service; and
storing, in a database system, the received values for the metadata attributes and a reference to the file stored by the selected cloud storage service.

12. The computer-readable storage medium of claim 11, further comprising, receiving, from the user interface, a confirmation that the file has been uploaded to the selected cloud storage service.

13. The computer-readable storage medium of claim 11, further comprising, transmitting an encryption key to the requesting client, wherein the file is encrypted using the encryption key prior to being uploaded to the selected cloud storage service.

14. The computer-readable storage medium of claim 11, wherein the reference to the file stored in the database comprises a reference used to access the file from the selected cloud storage service.

15. The computer-readable storage medium of claim 11, wherein the policy specifies at least one of a regulatory requirement, a data retention requirement, a location requirement, and a service availability requirement for the selected cloud storage service.

16. A routing device configured to transmit a file to one of a plurality of cloud storage services, comprising:
a processor; and
a memory storing a routing application configured to store advertised capabilities received from the plurality of cloud storage services, which, when executed on the processor, performs an operation, comprising:

receiving a file to be forwarded to one of the cloud storage services;

receiving one or more storage parameters specifying requirements of a storage policy associated with a tenant application for a cloud storage service selected to store the file;

evaluating the storage parameters to select a cloud storage service, of the plurality, which satisfies the specified requirements, wherein evaluating the storage parameters comprises matching the specified requirements against the advertised capabilities received from the plurality of cloud storage services;

forwarding the file and the one or more storage parameters to the selected cloud storage service.

17. The routing device of claim 16, wherein the storage parameters specify at least one of a regulatory requirement, a data retention requirement, a location requirement, and a service availability requirement for the selected cloud storage service.

* * * * *